US010373119B2

(12) United States Patent
Driscoll et al.

(10) Patent No.: US 10,373,119 B2
(45) Date of Patent: Aug. 6, 2019

(54) CHECKLIST GENERATION

(71) Applicant: Microsoft Technology Licensing, LLC, Redmond, WA (US)

(72) Inventors: Dan Driscoll, Seattle, WA (US); Thomas Matthew Laird-McConnell, Kirkland, WA (US); Andrea Ryuta Orimoto, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 14/992,569

(22) Filed: Jan. 11, 2016

(65) Prior Publication Data

US 2017/0199926 A1    Jul. 13, 2017

(51) Int. Cl.
*G06F 7/00* (2006.01)
*G06F 17/30* (2006.01)
*G06Q 10/10* (2012.01)

(52) U.S. Cl.
CPC .................... *G06Q 10/10* (2013.01)

(58) Field of Classification Search
CPC ......... G06F 17/30598; G06F 17/30994; G06F 16/285; G06F 16/904
See application file for complete search history.

(56) References Cited

U.S. PATENT DOCUMENTS 5,257,363 A * 10/1993 Shapiro ............... G06F 17/5013
700/83
7,555,459 B2    6/2009 Dhar et al.
8,510,399 B1 *  8/2013 Byttow .................. G06Q 10/10
707/770

(Continued)

FOREIGN PATENT DOCUMENTS

CN        104537159 A     4/2015

OTHER PUBLICATIONS

Hickey, Kasey Fleisher, "Quick Tip: Create Checklists Faster with Auto-Checkboxes", Published on: Sep. 14, 2012 Available at: https://blog.evernote.com/blog/2012/09/14/quick-tip-friday-create-checklists-faster-with-auto-checkboxes/.

(Continued)

*Primary Examiner* — Hasanul Mobin
(74) *Attorney, Agent, or Firm* — International IP Law Group, PLLC

(57) ABSTRACT

Systems, methods, and computer-readable media are presented that, in operation, generate a checklist from content in response to a checklist request from a user. More particularly, in response to the checklist request, a content type of the content identified by the checklist request is determined. The content is then analyzed, according to a determined content type, to identify a set of enumerative elements, the set of enumerative elements comprising at least two enumerative elements. Thereafter, for each enumerative element of the set of enumerative elements, a checklist item is generated, the checklist item corresponding to the enumerative element and including subject matter of the content corresponding to the enumerative element. Further, the generated checklist item is added as an item of the generated checklist. After iterating each enumerative element of the set of enumerative elements, the generated checklist is returned in response to the checklist request.

19 Claims, 6 Drawing Sheets

(56) References Cited

U.S. PATENT DOCUMENTS

| | | | |
|---|---|---|---|
| 8,700,719 B1* | 4/2014 | Covitz | G06Q 10/107 709/204 |
| 9,053,424 B1* | 6/2015 | Lewis | G06N 20/00 |
| 2003/0220125 A1* | 11/2003 | Ito | H04L 29/06 455/550.1 |
| 2004/0237758 A1* | 12/2004 | Bruti | G10H 1/0075 84/609 |
| 2004/0249790 A1* | 12/2004 | Komamura | G06F 17/3064 |
| 2005/0027578 A1 | 2/2005 | Chambers et al. | |
| 2005/0055225 A1 | 3/2005 | Mehl | |
| 2006/0290539 A1* | 12/2006 | Tomic | H03M 7/40 341/50 |
| 2007/0166689 A1 | 7/2007 | Huang et al. | |
| 2008/0177991 A1* | 7/2008 | Liu | G06F 11/2221 712/227 |
| 2008/0294988 A1 | 11/2008 | Nicholas et al. | |
| 2009/0292681 A1* | 11/2009 | Wood | G06F 17/30864 |
| 2011/0246251 A1* | 10/2011 | Saunders | G06Q 10/06 705/7.12 |
| 2011/0276396 A1* | 11/2011 | Rathod | G06F 17/30867 705/14.49 |
| 2012/0303655 A1* | 11/2012 | Gullion | G06Q 10/10 707/769 |
| 2013/0024492 A1* | 1/2013 | Graff | G06Q 10/1091 709/202 |
| 2013/0138467 A1 | 5/2013 | Small et al. | |
| 2014/0189520 A1 | 7/2014 | Crepps et al. | |
| 2015/0154520 A1* | 6/2015 | Federgreen | G06Q 10/063 705/7.11 |
| 2015/0220614 A1* | 8/2015 | Furukawa | G06Q 30/0204 707/737 |
| 2017/0269840 A1* | 9/2017 | Hasegawa | G06F 3/0605 |
| 2017/0338074 A1* | 11/2017 | Zhang | H01L 23/488 |

OTHER PUBLICATIONS

"Wrike Create a task", Published on: May 13, 2015 Available at: https://www.wrike.com/help/create-task/.

"Creating a checklist", Published on: Aug. 22, 2006 Available at: http://www2.geniesolutions.com.au/manual/HTML/index.html?creating_a_checklist.htm.

"Pocket Lists App", Retrieved on: July 20, 2015 Available at: http://www.pocketlistsapp.com/.

"Zoho", Published on: Sep. 18, 2014 Available at: https://www.zoho.com/people/help/checklists.html.

* cited by examiner

CHECKLIST GENERATION

BACKGROUND

There are numerous people that use checklists to organize and prioritize their activities, as well as track progress with regard to their various tasks and undertakings. For example, a human resource manager may use a "new hire" checklist when on-boarding a new employee. Alternatively, a stay-at-home dad may use a checklist just to keep up with all of the activities of the kids.

Computing devices, and particularly mobile computing devices, have advanced the use of checklists in everyday life. With a mobile computing device, a person can take maintain his/her checklist wherever that person goes, and consult with the checklist when needed.

While there are executable applications that manage a person's checklist or to-do items, creating the checklist is often cumbersome, especially as (quite frequently) the content from which one would create a checklist is generated by a third party and the person is simply viewing the content. In these circumstances, the process to create a checklist and, in particular, a user-actionable checklist where items on the list are associated with completion states, is to capture or copy the content that forms the basis of the checklist, enter the captured content into a checklist application, identify (or delineate) the individual steps/items of the checklist, and then generate the checklist based on the person's efforts.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems, methods, and computer-readable media are presented that, in operation, generate a checklist from content (e.g., an instruction manual, a flow chart, a webpage, and the like) in response to a checklist request from a user. More particularly, in response to the checklist request, a content type of the content identified by the checklist request is determined. The content is then analyzed, according to a determined content type, to identify a set of enumerative elements, the set of enumerative elements comprising at least two enumerative elements. Thereafter, for each enumerative element of the set of enumerative elements, a checklist item is generated, the checklist item corresponding to the enumerative element and including subject matter of the content corresponding to the enumerative element. Further, the generated checklist item is added as an item of the generated checklist. After iterating each enumerative element of the set of enumerative elements, the generated checklist is returned in response to the checklist request.

According to additional aspects of the disclosed subject matter, a computer-implemented method for generating a checklist from content in response to a checklist request from a computer user is presented. In execution, the method comprises at least determining a content type of the content identified by the checklist request. In addition to determining the content type, the content is analyzed according to the determined content type to identify a set of enumerative elements, where the set of enumerative elements comprises at least two enumerative elements. For each enumerative element of the set of enumerative elements, a checklist item is generated, the checklist item corresponding to the enumerative element and including subject matter of the content corresponding to the enumerative element. Additionally, for each enumerative element of the set of enumerative elements, the generated checklist item is added as an item of the generated checklist. After processing the enumerative elements, the generated checklist is returned in response to the checklist request.

According to further aspects of the disclosed subject matter, a computer-readable medium bearing computer-executable instructions is presented. The instructions, when executed on a computing system comprising at least a processor, carry out a method for generating a checklist from content in response to a checklist request from a computer user. The method comprises at least determining a content type of the content identified by the checklist request. Further, basis content of the content identified by the checklist request is identified. The content is then analyzed according to the determined content type to identify a set of enumerative elements in the basis content and to further identify a hierarchical structure of the enumerative elements, where the set of enumerative elements comprising at least two enumerative elements. For each enumerative element of the set of enumerative elements, a hierarchical level of the enumerative element within the hierarchical structure is determined, and a checklist item is generated, the checklist item corresponding to the enumerative element according to the determined hierarchical level of the enumerative element, the generated checklist item further including subject matter of the basis content corresponding to the enumerative element. The generated checklist item is then added as an item of the generated checklist. After processing the enumerative elements, the generated checklist is returned in response to the checklist request.

According to still further aspects of the disclosed subject matter, a computer system for generating a checklist from content in response to a checklist request from a computer user is presented. The system comprises a processor and a memory, where the processor executes instructions stored in the memory as part of or in conjunction with additional components to respond to the checklist request. The additional components comprise at least a checklist generator component. The checklist generator component is configured to, in execution/operation, generate a checklist for the computer user from the content in response to the checklist request from the computer user. Moreover, the checklist generator component comprises at least a document identification module. The document identification module is configured to determine a document type of the content identified by the computer user in the checklist request. Further, the checklist generator component comprises a plurality of document parser components, where each document parser component is configured to determine document structure and parse elements from content of one of a plurality of document types. A document analysis component, an element of the checklist generator component, is configured to carry out a document analysis of the identified content of the checklist request, in conjunction with a document parser selected according to the document type of the content. The document analysis component identifies a set of enumerative elements in the content, and further identifies a hierarchical structure of the enumerative elements in the content, where the set of enumerative elements comprising at least two enumerative elements. The checklist generator component still further comprises a checklist builder component, the checklist builder component being configured to iterate through the enumerative elements identified by the document analysis component and, for each enumerative element, generate a checklist item corresponding to the enumerative element according to the determined hierarchical level of the enumerative element. Moreover, the generated checklist item further includes subject matter of the basis content corresponding to the enumerative element. Also, for each enumerative element the generated checklist item is then added as an item of the generated checklist.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
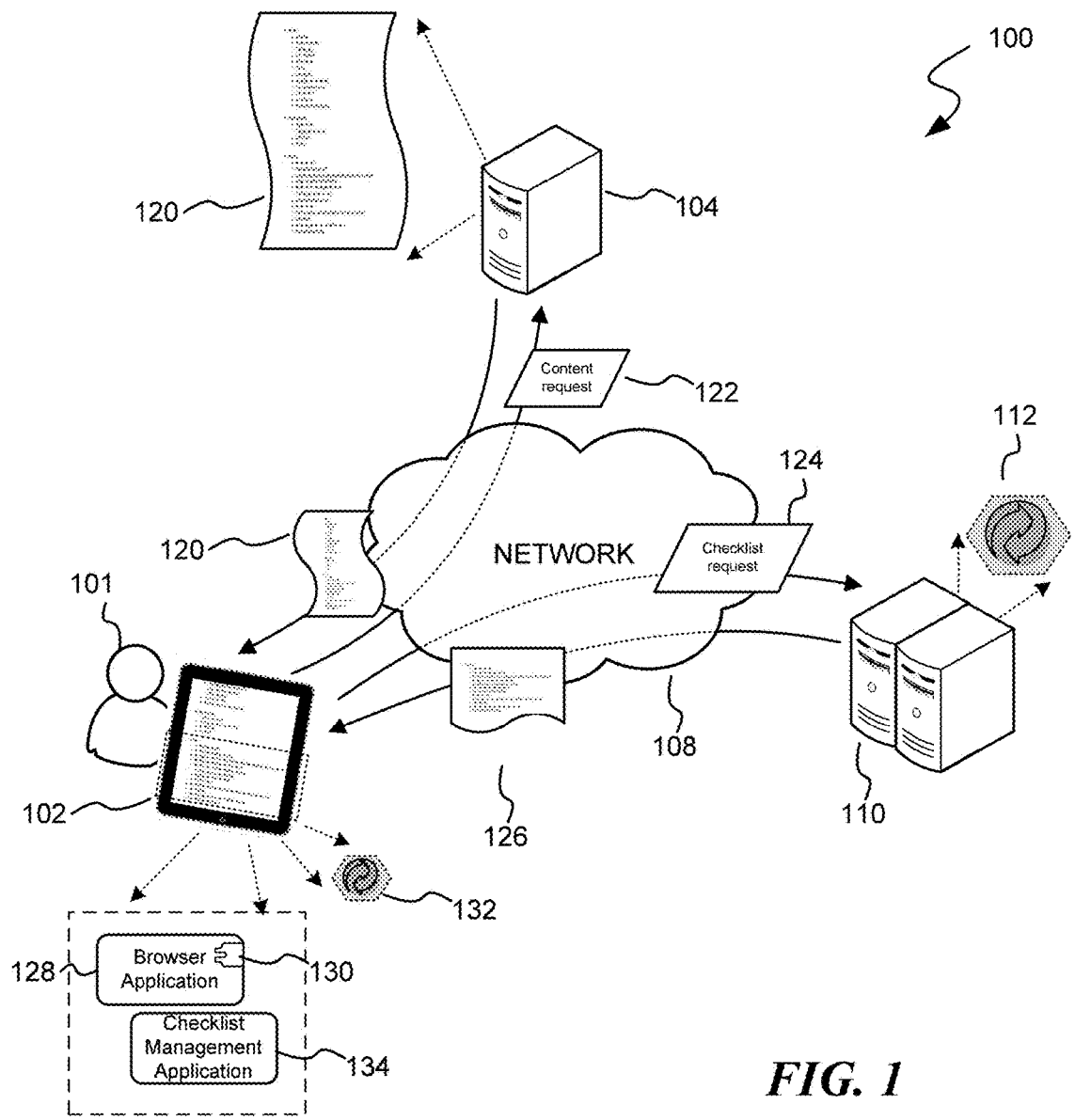
FIG. 1 is a pictorial diagram illustrating an exemplary network environment suitable for implementing aspects of the disclosed subject matter.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. By way of further definition and clarity, the term "basis content" refers to content from which a checklist is derived by a checklist generator (as will be described below.) Content may comprise textual content, audio content, video and/or image content, combinations thereof, and the like. Typically, the computer user identifies the bounds of the basis content (which may or may not correspond to the entire set of content from which the basis content is identified) and provides an instruction to generate a checklist from that basis content.

By way of definition, a "checklist" should be interpreted as a set or list of two or more list items, each "list item" corresponding to an identifiable task, purpose or step of the checklist. A checklist may be comprised of list items that are associated with an order, a prioritization, nesting or multi-level, and the like as well as combinations thereof. List items that are ordered include at least one list item whose status must be updated to an appropriate level (e.g., changed from an uncompleted status to a completed status) before a second list item can be, or should be, undertaken. Prioritized list items imply that at least a first list item of the checklist is associated with a priority level that is higher than a second list item of the checklist. A list item that is nested or multi-leveled indicates a sub-set of list items that are related to a parent (or superior) list item. Depending on the nature of the checklist, the status of the parent list item may or may not be able to be updateable depending on whether or not the status of each of the sub-set of list items is similarly updated. As will be appreciated, multi-leveled checklists may imply a relationship among the sub-elements of a parent item, such that the parent is not complete until its sub-elements are completed. Conversely, if a parent item of a multi-level checklist is marked as being not-applicable, those sub-items may also be viewed as being not-applicable.

As suggested above, each list item in a checklist generated according to aspects of the disclosed subject matter may be associated with a status. The status of any given list item may updateable by the person for which the checklist is generated. By way of illustration and not limitation, the status of a list item may comprise a binary value (e.g., checked/unchecked, yes/no, completed/not completed, true/false, etc.). Alternatively, the status of a list item may comprise one of a set of values, e.g., {true, false, unknown}, {completed, not started, in progress}, not applicable, and the like. Still further, in various embodiments the status of a list item may comprise a range of values (which may or may not correspond to whole numbers/values), e.g., 0-100%, 1-10, etc.

As indicated above, checklist applications—including a checklist generator configured according to aspects of the disclosed subject matter—may be advantageously implemented on computing devices, including mobile computing devices. By way of definition, a mobile computing device should be interpreted as being a portable computing device that includes a processor and a memory, and that may be connected to other devices or services over a communication network via one or more wireless protocols, such as by way of illustration and not limitation: Bluetooth, NFC (near field communications), various Wi-Fi protocols, 3G, and the like. Examples of mobile computing include, by way of illustration and not limitation: smartphones, phablet computing devices ("phablets"), tablet computing devices ("tablets"), smart watches, personal digital assistants, and the like. Typically, though not exclusively, a mobile computing device is interactive by way of a touch-sensitive display screen and/or other buttons or controls on the device, as well as one or more other natural user interfaces (NIUs). Additionally, while the disclosed subject matter is advantageously implemented on a mobile computing device, it should be appreciated that the disclosed subject matter may be also be advantageously and additionally implemented on a more full-featured computing device having additional user input mechanisms such as keyboards, pointing devices, and the like. These more full-featured computing devices include, by way of illustration and not limitation a desktop computer, a laptop computer, mini- and/or mainframe computers, and the like.

According to aspects of the disclosed subject matter, a checklist generator is provided. Generally speaking, a checklist generator may be implemented as an executable application and/or service, residing either on a user computer or implemented as an online service, which receives a request from a computer user to convert content into a checklist, and more particularly, a user-actionable checklist. More particularly, in response to receiving a computer user's indication of basis content, the basis content is analyzed to identify two or more enumerative items, converts each enumerative item to a list item, creates a checklist according to the converted list items, optionally presents the checklist items to the user for alteration (e.g., modification, merging, addition, deletion, leveling, etc.), and stores the checklist in a data store as one of a set of checklists corresponding to the computer user. Advantageously and in contrast to other applications and/or processes for creating checklists, the computer user may identify basis content from content sources not associated with the computer user (e.g., third party sources), or while viewing the basis content via an application that is not associated with generating a checklist. For example, according to aspects of the disclosed subject matter, a computer user (or, more simply, a "user") may be viewing a web page hosted on a third party web site, or viewing a document in a word processing application. As such and beneficially, the computer user is not forced to switch from a current application in which the computer user is viewing the content to a checklist generation application. Additionally and as suggested above, the computer user is able to identify basis content from any number of content sources, and is not constrained to copy or transfer the viewed content from a viewing source to a checklist generator. Still further and according to various aspects of the disclosed subject matter, a user is not constrained to a particular type/format of basis content: the checklist generator is advantageously configured to determine a content type for the basis content and identify a checklist from the basis content. These, and other beneficial aspects of the disclosed subject matter are discussed in greater detail below in regard to the figures.

Turning to the figures, FIG. 1 is a block diagram illustrating an exemplary network environment 100 suitable for implementing aspects of the disclosed subject matter. The exemplary network environment 100 includes a user computer 102 connected to a network 108 such that the user computer may communicate and otherwise interact with other computing devices and/or services also connected to the network, including computers 104 and 110. For purposes of illustration and example, and not by way of limitation, network computer 104 hosts content for viewing by others, such as content 120. Additionally, for purposes of illustration and example, and not by way of limitation, network computer 110 hosts a network-accessible checklist generator service 112 which can be accessed by services on various user computers, including user computer 102, to generate a checklist from basis content as will be described below.

By way of illustration and not limitation, a computer user 101, via user computer 102, may issue a content request 122 to access content 120 from a network computer, such as network computer 104. By way of illustration and example and not limitation, content 120 may be a web-accessible document, such as an HTML (hyper-text markup language) document or XML (extensible markup language) that the computer user 101 wishes to view by way of an internet browser application operating on the user computer 102. Further still, the content may comprise a composite document referencing multiple individual documents. In response to the content request 122, network computer 104 returns a copy of the content 120 to the user computer 102 which is displayed on the user computer by way of a presentation application, such as an internet browser application 128.

By way of further example and illustration, it is assumed that the computer user 101 desires to convert all or a portion of the content 120 into a checklist. According to aspects of the disclosed subject matter, the computer user 101 invokes a checklist service 132 on the user computer. According to aspects of the disclosed subject matter and by way of illustration and not limitation, the checklist service 132 may be implemented as an operating system-level service that executes as a daemon on the user computer, or as an executable plug-in service of the presentation application, such as a plug-in module 130 of the browser application 128 or a suitably configured application (not shown). According to one embodiment, the checklist service 132 enables the computer user 101 to select all or a portion of the displayed content 120 for processing into a checklist. Alternatively or additionally, the checklist service 132 utilizes a current user selection (or the entirety) of the content as the basis content for generating a checklist. As shown in FIG. 1 and by way of example, the computer user 101 has selected a portion 102 of the displayed content as the basis content for generating a checklist.

With the basis content identified, the basis content is submitted to the checklist generator service 112 in the form of a checklist request 124. By way of illustration and not limitation, the checklist request identifies the content to be converted to a checklist. Indeed, the checklist request may include the content and/or reference the content such as by way of hyperlink, and/or URL (uniform resource locator). Further still, the checklist request may also include metadata regarding the content, such as encoding information, bases for identifying enumerative elements, and the like. As already mentioned, the content may be owned by the computer user or may be third-party content, such as content 120 shown in FIG. 1. As will be described in more detail below, the checklist generator service 112 determines the type of content that has been submitted, analyzes the basis content according to the bounds identified by the requesting computer user, generates a checklist according to the analysis, optionally interacts with a user with regard to the in-generation checklist for user alteration, approval, clarification, etc., and returns the checklist 126 to the requesting checklist service 132 to be placed with other checklists in a checklist management application 134.

While the above example of generating a checklist from content 120 describes the checklist generator service 112 as residing on a network computer 110 external to the user computer 102, and further describes the checklist management application 134 as executing on the user computer 102, it should be appreciated that these are illustrative embodiments and/or configurations and should not be viewed as limiting upon the disclosed subject matter. Indeed, in various embodiments, both the checklist generator service 112 and the checklist management application 134 may be implemented on a computing device, such as network computer 110, external to the user computer 102. Alternatively, both the checklist generator service 112 and the checklist management application 134 may be implemented on the user computer 102. Indeed, according to various embodiments of the disclosed subject matter, connectivity to other network computers over a network 108 is not required in order to advantageously implement embodiments of the disclosed subject matter. Accordingly, the embodiment set forth in regard to the network environment 100 of FIG. 1 should be viewed as illustrative and not limiting upon the disclosed subject matter.

With regard to the network environment 100 of FIG. 1, while this illustrates an exemplary environment that includes a user computer 102 and an external checklist generator service 112, it should be appreciated that this is illustrative and not limiting upon the disclosed subject matter. In an alternative embodiment, the user computer 102 may be suitably configured to operate on its own, i.e., to include a resident checklist generator service on the user computer.

Figure 2:
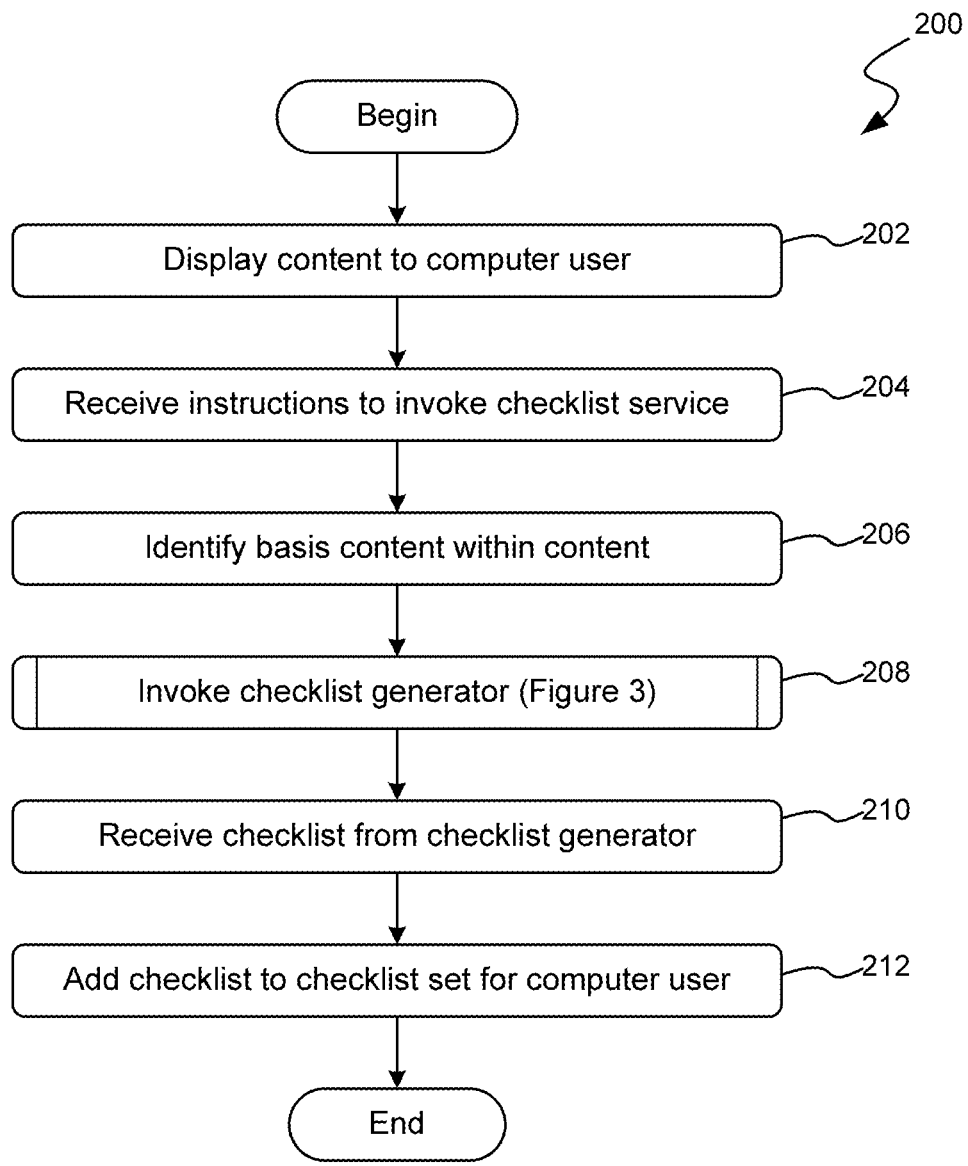
FIG. 2 is a flow diagram illustrating an exemplary routine for obtaining a checklist from content presented to the computer user on a computing device.

FIG. 2 is a flow diagram illustrating an exemplary routine 200 for obtaining a checklist from content presented to the computer user on a computing device, such as in the example described above in regard to FIG. 1. Beginning at block 202, content (such as content 120 of FIG. 1) is presented to the computer user on a user computer. At block 204, instructions are received to invoke the checklist service, such as checklist service 132.

At block 206, the basis content for generating a checklist is identified from the content displayed to the computer user. By way of illustration and not limitation, the basis content may be identified through a user interface provided by the checklist service 132, in which the computer user identifies which portions (or all) of the content that is to be used in generating the checklist. Thereafter, at block 208, the checklist generator is invoked with regard to the identified content basis. The invocation of the checklist generator to generate a checklist may comprise, by way of illustration and not limitation, a checklist request 124 that includes the content (or a reference to the content), and the bounds for determining the basis content. The execution of the checklist generator is described in greater detail below in regard to FIG. 3.

Figure 3:
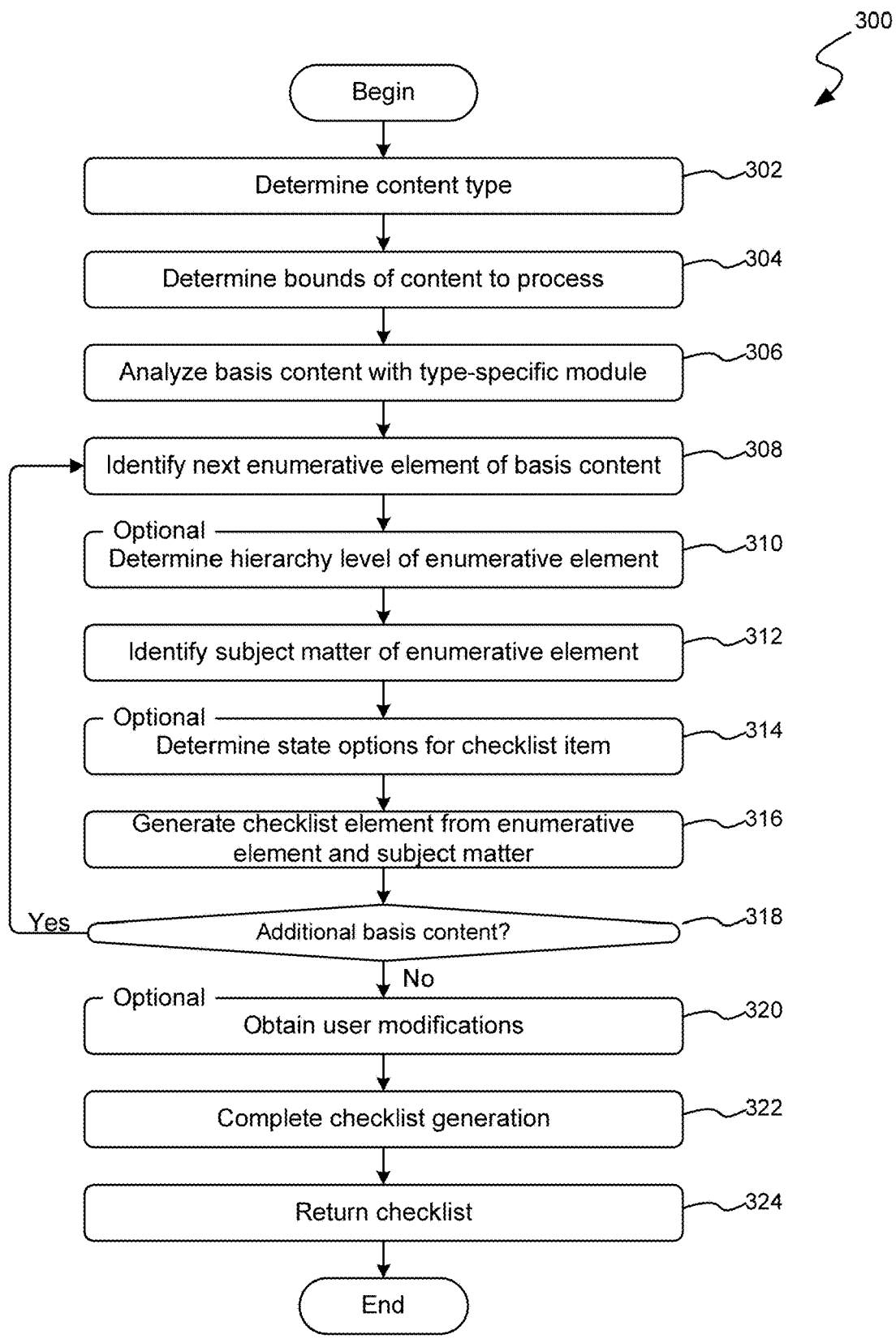
FIG. 3 is a flow diagram illustrating an exemplary routine for processing content into a checklist according to aspects of the disclosed subject matter.

Indeed, turning to FIG. 3, this figure shows a flow diagram illustrating an exemplary routine 300 for processing content into a checklist according to aspects of the disclosed subject matter. Beginning at block 302, a first analysis of the content is made to determine the type of content (assuming that the information is not included in the checklist request, which may be the case in one or more embodiments.) Determining the content type is advantageous in understanding the content itself. For example, an HTML or an XML document may use document tags, including structural, formatting, lists, tables, and the like that may lend themselves to identifying enumerative elements, enumerative sub-elements, hierarchy, and the like. On the other hand, in identifying an item of content as a word processing document, such as Microsoft® Word® document, a checklist generator service 112 may leverage enumerative codes and structures to identify the enumerative elements and sub-elements within the content.

At block 304, the bounds of the content (i.e., the basis content) to be converted to a checklist are determined. Thereafter, at block 306, an analysis of the basis content is conducted with a type-specific module, as well as additional modules to generate the checklist. As suggested above, the type of the item of content lends itself to identifying the hierarchal or multi-level structure and organization of the basis content, sometimes referred to as document object models (or DOMs) and may be used in identifying enumerative elements within the basis content. Also identified as part of the analysis are the enumerative elements within the basis content. While suggested above, it should be appreciated that a previously generated checklist may be the basis content for generating another checklist, especially when combined with optional user interaction to update, modify, and/or alter the original checklist.

At block 308, an iterative loop is begun to iterate through the analyzed basis content to extract the checklist elements (i.e., the individual steps/items of a checklist). Thus, at block 308, the next (or first if this is the first iteration) enumerative element of the basis content is identified. For example and limitation, identifying enumerative elements may include identifying textual patterns/words that signify an enumerative process such as "One" "Two" and so on, discovering numberings such as "1" "2" and so on, or discovering lettering such as "A" and "B", roman numerals, bulleted structures, and so on. In word processing documents these enumerative elements typically, but not exclusively are found at the beginning of paragraphs and/or blocks of text. Of course, control functions within the document that produce such enumerative elements are also identified. On the other hand, while enumerative textual patterns may exist within the body of content encoded in mark-up languages, such HTML or XML, enumerative items may also be included as part of the tags.

With regard to the enumerative elements, while checklist items will often correspond in a 1:1 manner with enumerative elements, this is not a requirement of the disclosed subject matter. Indeed, the source content may include checklist items for which there is no corresponding enumerative element. An example (for illustration and not limitation) may include a checklist item that simply conveys a title without any particular activity. Conversely, a single checklist item in source content may be identified (through the first analysis discussed above) as corresponding to multiple enumerative elements.

By way of illustration, assume that the basis content includes the following:

Directions
- Preheat oven to 350° F.
- Grease and flour baking pan (9×13)
- Stir together sugar, flour, cocoa, baking powder, baking soda, and salt in a large bowl
- Add eggs, milk, applesauce and vanilla extract
- Beat with a mixer on medium speed for 2 minutes
- Stir in boiling water (batter will be thin)

As can be seen, for this example the enumerative elements include "●" and "○". Thus, for this example and corresponding to the first iteration, the identified enumerative element would be the bullet point, "●".

At block 310, a hierarchy, or hierarchical level, for the identified enumerative element is determined. Of course, determining the hierarchy or leveling of an enumerative element may be an optional step as the checklist generator service may or may not be configured to include any hierarchy/multi-leveling. In the above example, the hierarchy/level for the first enumerative element ("●") would be the top-most level, perhaps identified internally as level 0.

At block 312, the subject matter relating/corresponding to a particular enumerative element is identified. In regard to the above-listed example, the corresponding subject matter for the first enumerative element ("●") is "Directions." Of course, it should be appreciated that while the corresponding subject matter of each "step" in the above-identified example can be determined/delineated by an end-of-line character, the disclosed subject matter is not so limited. Indeed, in many (perhaps even most) circumstances, the delineation of corresponding subject matter for an enumerative element may include all of the subject matter between the current enumerative element and a subsequent enumerative element. Moreover, the corresponding subject matter may span over multiple lines, paragraphs, and/or pages and include textual content, images, tables, videos, audio files, hyperlinks, and the like.

After identifying the corresponding subject matter for the currently iterated enumerative element, at block 314 an optional determination of state options for the enumerative element in the checklist is determined. According to aspects of the disclosed subject matter, states may be associated with checklist elements in a generated checklist as a way to indicate completion or achievement of the task that a checklist element represents. In this regard, the states correspond to user-actionable controls in regard to a particular checklist element in a generated checklist. There may be several types of states associated with any one checklist element, the most common being a binary state (represented by any number of pairs: {yes/no}, {true/false}, {completed/not completed}, and the like.) However, other useful states are tertiary states (e.g., {yes/no/pending}, {completed/in progress/not started}, {true/false/unknown}, {yes/no/not applicable}, and the like) and other states (that include any number of configurations of counters, order items, and the like.) Of course, there may also be checklist elements that are informational and/or placeholders which do not have corresponding states. For example, the first element of the above-listed example may be simply a title checklist element such that no user-actionable control is generated for "Directions." Further and by way of illustration and not limitation, the state of the second element of the above-listed example, "Preheat oven to 350° F.," may correspond to a binary state, e.g., {yes/no}, or to a tertiary state, e.g., {not started/heating/ready}.

At block 316, the information regarding the currently iterated enumerative element (as determined by the steps of blocks 308-314) is used in generating the corresponding checklist element for the resultant checklist. In particular, this information includes, by way of illustration and not limitation, level/hierarchy information, subject matter content that is extracted (and may also be formatted according to requirements of the generated checklist or checklist management application) from the basis content for the enumerative element, state option(s), and the like. Thereafter, at decision block 318, a determination is made as to whether there is additional content in the basis content to process, or whether the iteration has processed all of the basis content. If there is additional content in the basis content to process, the routine 300 returns to block 308 to continue processing. Alternatively, if there is no additional content to process, the routine 300 proceeds to block 320.

At block 320, the in-generation checklist is presented to a user for validation, clarification with regard to interpreted steps, modification and/or alteration of one or more checklist elements (such as adding, deleting, merging, renaming, re-ordering, editing, and like), adding or modifying status information for any or all of the checklist items, identifying user actionable controls associated with the various checklist items, altering supporting basis content, and/or updating information regarding checklist levels. Thereafter, at block 322, the checklist generation is completed according to the checklist elements that have been created through the iterative steps of 308-316. Of course, completing the checklist generation may also include formatting the information into a format such that the generated checklist may be added to other checklists for the requesting computer user as managed by a checklist management application 134. Thereafter, at block 324, the generated checklist is returned.

Returning to FIG. 2, after having invoked the checklist generator to generate the checklist from the basis content, at block 210 the generated checklist is received. At block 212, the generated checklist is added to a set of checklists for the computer user, as managed by a checklist management application 134. Thereafter, the routine 200 terminates.

Regarding routines 200 and 300 described above, as well as other processes (such as the interaction process set forth in FIG. 1) describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be omitted. Those skilled in the art will recognize that the logical presentation of steps is sufficiently instructive to carry out aspects of the claimed subject matter irrespective of any particular development language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

These routines/processes are typically embodied within executable code modules comprising routines, functions, looping structures, selectors such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or deliver the computer-executable instructions and data to a computing device for execution by one or more processor via various transmission means and mediums including carrier waves and/or propagated signals, for purposes of this disclosure computer readable media expressly excludes carrier waves and/or propagated signals.

Figure 4:
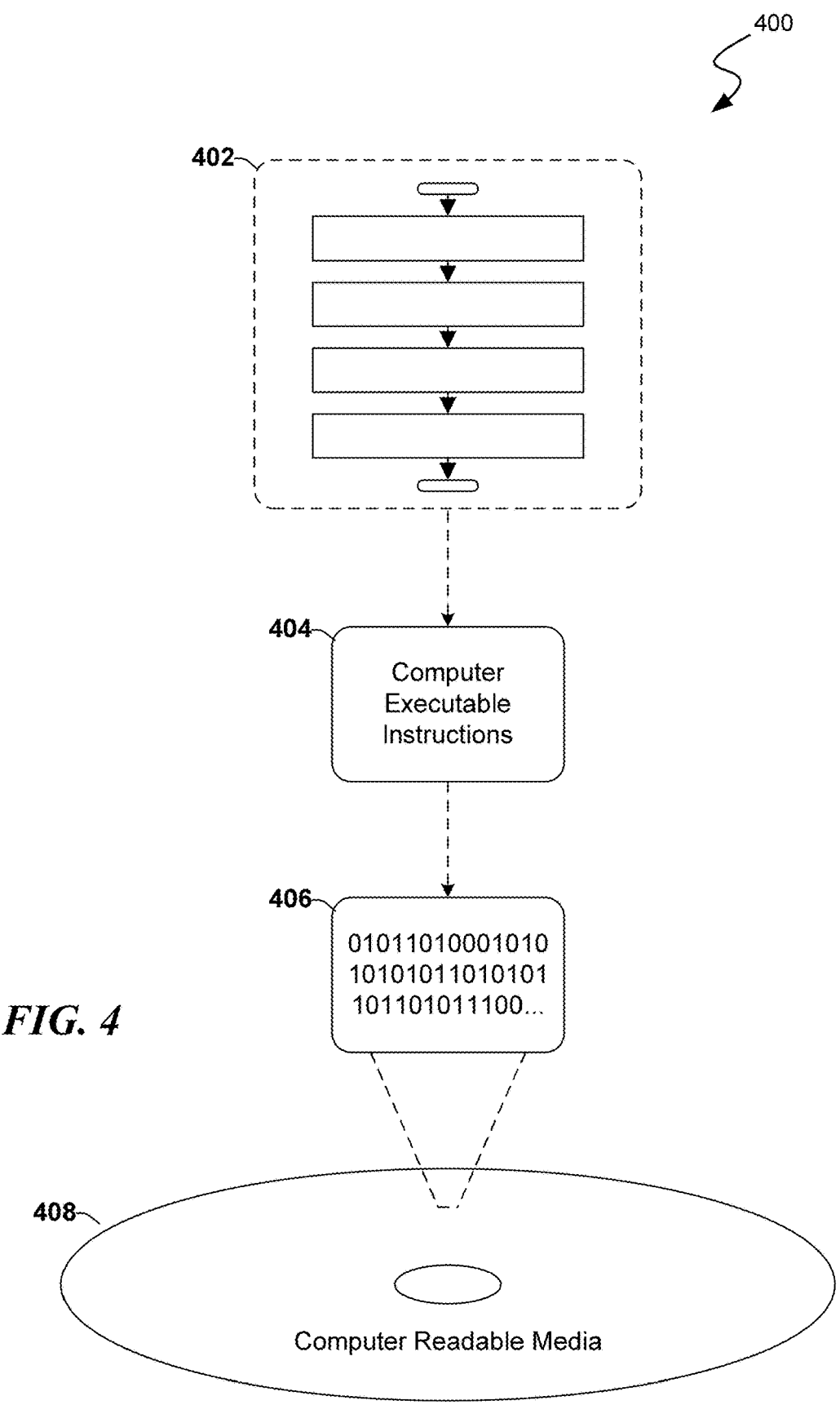
FIG. 4 illustrates an exemplary computer-readable media generation process that may be used to manufacture computer-readable media in accordance with the above description.

Turning to FIG. 4, this figure illustrates an exemplary computer-readable media generation process 400 that may be used to manufacture computer-readable media in accordance with the above description. More particularly, the process 400 comprises a computer-readable medium 408 (e.g., a CD-R, DVD-R or a platter of a hard disk drive), on which is encoded computer-readable data 406. This computer-readable data 406 in turn comprises a set of computer instructions 404 configured to operate according to one or more of the principles set forth herein. In one such embodiment 402, the processor-executable instructions 404 may be configured to perform a method, such as at least some of the exemplary method 200 or 300 of FIGS. 2 and 3 respectively, for example. In another such embodiment, the processor-executable instructions 404 may be configured to implement or configure a computing system, such as at least some of the exemplary computing system 500 of FIG. 5, as described below. Many such computer-readable media may be devised by those of ordinary skill in the art that are configured to operate in accordance with the techniques presented herein.

Figure 5:
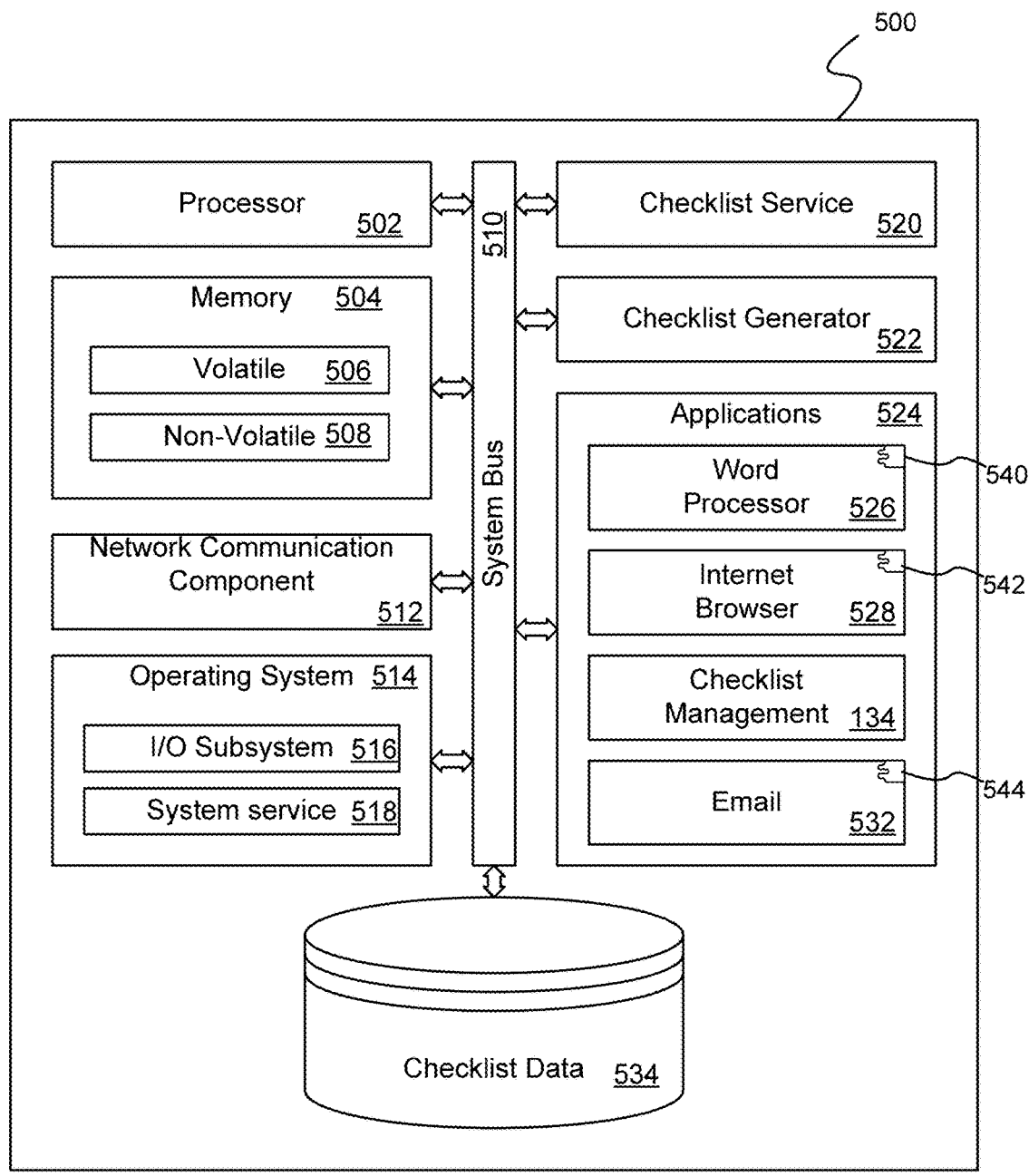
FIG. 5 a block diagram illustrating an exemplary computing device suitable for generating a checklist from an item of content.

Turning now to FIG. 5, FIG. 5 is a block diagram illustrating an exemplary computing device 500 suitably configured for generating a checklist from an item of content. The exemplary computing device 500 includes one or more processors (or processing units), such as processor 502, and one or memories, such as memory 504. The processor 502 and memory 504, as well as other components, are interconnected by way of a system bus 510. The memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

The processor 502 executes instructions retrieved from the memory 504 (and/or from computer-readable media, such as computer-readable media 400 of FIG. 4) in carrying out various functions, particularly in regard to generating a checklist from basis content, as discussed and described above. The processor 502 may be comprised of any of a number of available processors such as single-processor, multi-processor, single-core units, and multi-core units.

Further still, the illustrated user computing device 500 includes a network communication component 512 for interconnecting this computing device with other devices and/or services over a computer network, such as network 108, including network computing devices 104 and 110, as shown in FIG. 1. The network communication component 512, sometimes referred to as a network interface card or NIC, communicates over a network (such as network 108) using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

The exemplary computing device 500 also includes an operating system 514 that provides basic services and execution environment for the computing device. As shown in FIG. 5, the operating system 514 includes at least an I/O (input/output) subsystem 516 and one or more system services, such as system service 518, which operate as processes, daemons, device drivers, and the like such that the various components of the computing system may function within the computing system and are accessible (typically via operating system service calls) to executable processes, including one or more applications. As will be readily appreciated, the I/O subsystem 516 comprises a set of hardware, software, and/or firmware components that enable or facilitate inter-communication between a user of the computing device 500 and the executing processes of the computing device 500. Indeed, via the I/O subsystem 516, a computer user may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. Indeed, it is through the I/O subsystem 516 that a computer user interacts with an executing application to view/browse content, identify basis content, invoke the generation of a checklist from the basis content, manage the user's checklists including those generated by a checklist generator, and the like.

The exemplary computing device 500 further includes a checklist service 520. As indicated above and according to aspects of the disclosed subject matter, the checklist service 520 may be implemented as an operating system-level service (such as system service 518) that executes as a daemon on the user computer, or as an executable plug-in service of a presentation application, such as a plug-in module 540 of the internet browser application 528, the plug-in module 542 of word processing application 526, and/or a plug-in module 544 of the email application 532. According to one embodiment, the checklist service 520 enables a computer user, such as computer user 101 of FIG. 1, to select all or a portion of displayed content for processing into a checklist and initiate the generation of a checklist from the identified/selected content (i.e., the basis content). Alternatively or additionally, the checklist service 520 utilizes a current user selection (or the entirety) of the content as the basis content for generating a checklist.

The exemplary computing device 500 further optionally includes a checklist generator 522. As indicated above, a checklist generator may be implemented as an executable application, as a daemon or operating system service, as an executable hardware component, and the like. Moreover, while the checklist generator 522 is shown as residing on the computing device 500 that may typically be operated by a computer user (such as computer user 101), it should be appreciated that this is illustrative and not limiting upon the disclosed subject matter. Indeed, the checklist generator 522 may be implemented on a user computing device (such as user computing device 102 of FIG. 1) and/or on a network computer as an online service (such as checklist generator service 112 operating on network computer 110 of FIG. 1).

Figure 6:
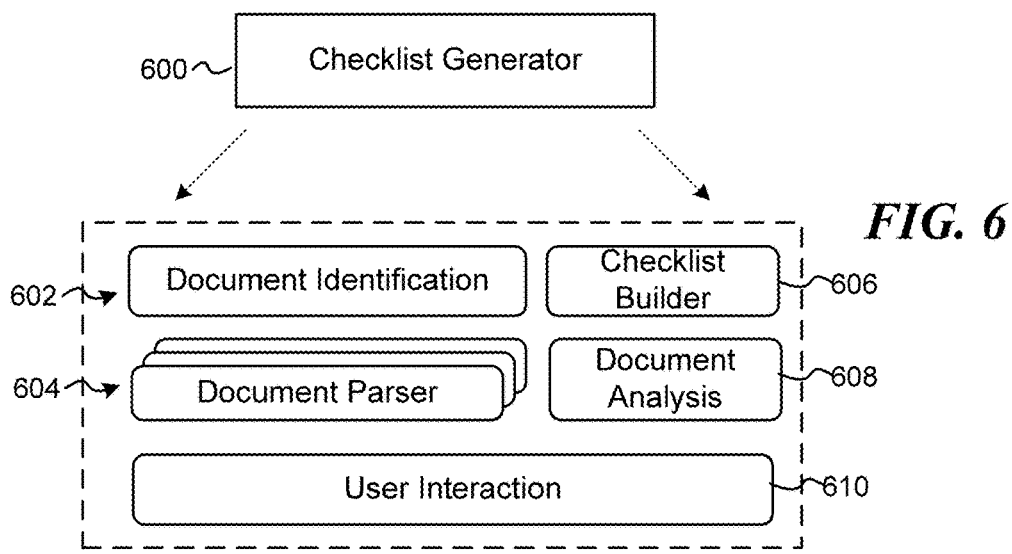
FIG. 6 is a block diagram illustrating exemplary, functional components of a checklist generator.

Turning to FIG. 6, FIG. 6 is a block diagram illustrating exemplary, functional components of a checklist generator 600. Indeed, as discussed above, in response to receiving a computer user's indication of basis content, the basis content is examined, by a document identification component 602 to identify the particular format of the basis content/document. Based on the identified format, a document parser 604 (of a logical set of document parsers), as selected according to the previously determined document type, is employed by a document analysis component 608 (typically implemented as an executable hardware or software component) to determine document structure, identify enumerative elements/items, and identify subject matter related to each enumerative element. Based on the analysis and identifications of the document analysis component 608, a checklist builder 606 aggregates the various elements, adds user-actionable controls to the elements (according to the various states that may be associated with any particular element), and returns the generated checklist in response to the user request.

According to various embodiments of the disclosed subject matter, the checklist generator 600 may be further configured to include a user interaction module 610 by which a user may interact with the checklist generator 600 in clarifying, adding, deleting, and/or modifying various elements of a checklist as it is being generated. Indeed, as will be readily appreciated, there may be times in which the user may wish to add, remove, modify, merge, or otherwise alter various steps within a checklist, either after the checklist is generated or during generation. It is through the user interaction module 610 that a user may provide these alterations.

Returning again to FIG. 5, in regard to the checklist service 520 and checklist generator 522, while these are illustrated as separate executable components of the computing system 500, this is for functional illustration and should not be viewed as limiting upon the disclosed subject matter. While they may be implemented as separate components, in various embodiments the checklist service 520 and checklist generator 522 may be implemented as a single operating system-level service or daemon, executable hardware component (such as encoded ROM (read-only memory), PROM (programmable read only memory), EPROM (erasable, programmable read only memory), PLA (programmable logic array), IC (integrated circuit), and the like) and/or executable app or application.

The exemplary computing device 500 typically further includes one or more executable applications 524 including, by way of illustration and not limitation, a word processor application 526, an internet browser application 528, an email application 532, and a checklist management application 134. As illustratively indicated, each of the word processor application 526, the internet browser application 528, and the email application 532 are illustratively shown as including plug-in modules, plug-in modules 540-544 respectively, to indicate that the checklist services may be invoked by way of plug-in module such that the applications need not be specifically configured to invoke the checklist services described above. Alternatively, invocation of the checklist services/functionality may be accomplished by way of operating system-level services that may automatically be available in any and all applications executing on the computing device 500. In regard to the checklist management application 134, for illustration purposes it is assumed that this application is specifically configured to access the checklist functionalities described above, though in various embodiments, the checklist management application may also include plug-in modules and/or advantageously utilize operating system-level services.

Still further included in the exemplary computing device 500 is a checklist data store 534. The checklist data store 534 stores the generated checklists of the checklist generator 522 for a computer user. Moreover, the checklists of the computer user are typically managed by the computer user by way of the checklist management application 134. Of course, according to various embodiments of the disclosed subject matter, the checklist data store 534 may be managed by a network or cloud service on behalf of a plurality of computer users. Accordingly, while the exemplary computing device 500 is shown as including a checklist data store 534, this should be illustrative of various embodiments but not viewed as limiting upon the disclosed subject matter.

Figure 7:
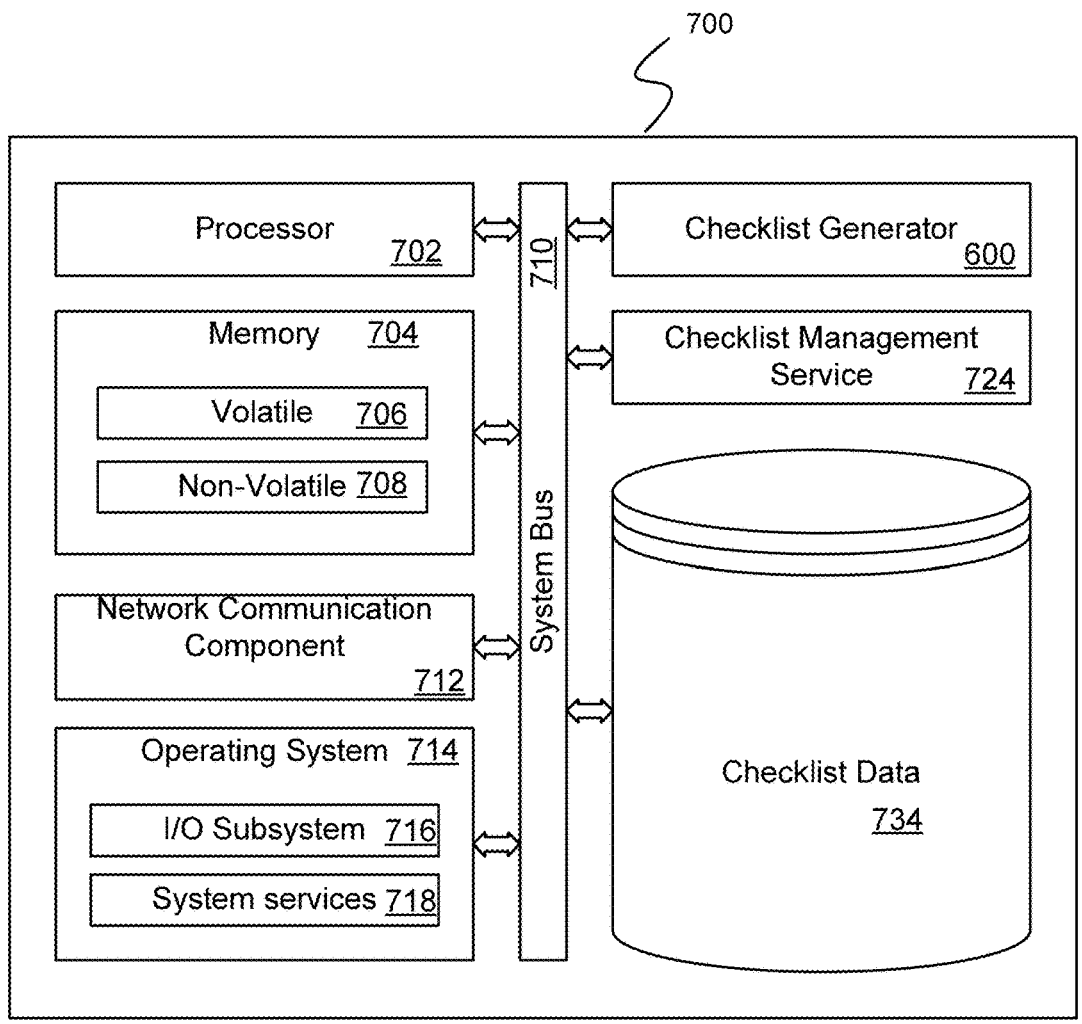
FIG. 7 is a block diagram illustrating an exemplary computing device suitably configured for generating a checklist from an item of content in response to a checklist request issued by a computer users remote to the computing device.

The exemplary computing device 500, as indicated above, is shown as including both a checklist service 520 and a checklist generator 522, as may advantageously be implemented in various user computing device configurations. Alternatively, FIG. 7 is a block diagram illustrating an exemplary computing device 700 suitably configured for generating a checklist from an item of content in response to a checklist request issued by a computer users remote to the computing device. As with computing device 500, computing device 700 includes one or more processors (or processing units), such as processor 702, and one or memories, such as memory 704. The processor 702 and memory 704, as well as other components, are interconnected by way of a system bus 710. The memory 704 typically (but not always) comprises both volatile memory 706 and non-volatile memory 708.

The processor 702 of exemplary computing device 700 executes instructions retrieved from the memory 704 (and/or from computer-readable media, such as computer-readable media 400 of FIG. 4) in carrying out various functions, particularly in regard to generating a checklist from basis content, as discussed and described above. The processor 702 may be comprised of any of a number of available processors such as single-processor, multi-processor, single-core units, and multi-core units.

Further still, the illustrated network computing device 700 includes a network communication component 712 for interconnecting this computing device with other devices and/or services over a computer network, such as network 108, including network computing devices 104 and 102, as shown in FIG. 1. The network communication component 712 (or NIC), communicates over a network (such as network 108) using one or more communication protocols via a physical/tangible (e.g., wired, optical, etc.) connection, a wireless connection, or both. As suggested above, such as network communication component 712, is typically comprised of hardware and/or firmware components (and may also include or comprise executable software components) that transmit and receive digital and/or analog signals over a transmission medium (i.e., the network.)

The exemplary computing device 700 also includes an operating system 714 that provides basic services and execution environment for the computing device. As shown in FIG. 7, the operating system 714 includes at least an I/O (input/output) subsystem 716 and one or more system services, such as system service 718, which operate as processes, daemons, device drivers, and the like such that the various components of the computing system may function within the computing system and are accessible (typically via operating system service calls) to executable processes, including one or more applications. As will be readily appreciated, the I/O subsystem 716 comprises a set of hardware, software, and/or firmware components that enable or facilitate inter-communication between a user of the computing device 700 and the executing processes of the computing device 700.

The exemplary computing device 700 also includes a checklist generator 600. As indicated above, a checklist generator may be implemented as an executable application, as a daemon or operating system service, as an executable hardware component, and the like. In response to receiving a checklist request 124 from a computer user, the checklist generator 600 analyzes the basis content and generates a corresponding checklist, typically with user-actionable controls associated with individual elements of the checklist, the controls corresponding to a present state of each checklist element. In operation, the checklist generator 600 implements the checklist generator service 112 (FIG. 1), as set forth above.

Also optionally included in the exemplary computing device 700 is a checklist management service 624. In contrast to the checklist management application 134 of FIG. 5, the checklist management service 624 is configured to manage checklists for multiple users and operates as an online service of the exemplary computing device 700 in conjunction with a checklist data store 734.

Regarding the various components of the exemplary computing devices 500 and 700, those skilled in the art will appreciate that these components may be implemented as executable software modules stored in the memory of the computing device, as hardware modules and/or components (including SoCs—system on a chip), or a combination of the two. Indeed, as indicated above, components such as the calendar module 616 and it sub-components including the suggestion module 618, the user interaction module 620, the scheduling module 622, and the calendar event creation module 624 may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, ICs (integrated circuits), and the like, each of which may be encoded with instructions and/or logic which, in execution, carry out the functions described herein.

Moreover, in certain embodiments each of the various components of the exemplary computing devices 500 and 700 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network, such as network 108 of FIG. 1.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for generating a checklist from content in response to a checklist request from a computer user, the method comprising:
   determining a content type of the content identified by the checklist request;
   determining basis content of the content identified by the checklist request via a user interface of a checklist service, wherein the basis content is determined according to bounds established by a computer user and included in the checklist request;
   analyzing the content according to the determined content type to identify a set of enumerative elements in the basis content and to further identify a hierarchical structure of the enumerative elements, the set of enumerative elements comprising at least two enumerative elements;
   for each enumerative element of the set of enumerative elements:
      determining a hierarchical level of the enumerative element within the hierarchical structure;
      generating a checklist item corresponding to the enumerative element according to the determined hierarchical level of the enumerative element, the generated checklist item further including at least a portion of subject matter of the basis content corresponding to the enumerative element; and
      adding the generated checklist item as an item of the generated checklist; and returning the generated checklist in response to the checklist request.

2. The computer implemented method of claim 1 further comprising:
   determining bounds of the content to be processed in generating the checklist, and
   wherein analyzing the content to identify the set of enumerative elements comprises analyzing the content within the determined bounds of the content to be processed.

3. The computer implemented method of claim 2, wherein the bounds of the content to be processed is less that the entire content.

4. The computer implemented method of claim 2, wherein the bounds are identified by the computer user in the checklist request.

5. The computer implemented method of claim 1, wherein analyzing the content further identifies a hierarchical structure among the identified enumerative elements of the set of enumerative elements.

6. The computer implemented method of claim 5 further comprising:
   for each enumerative element of the set of enumerative elements:
      determining the hierarchical level of the enumerative element within the hierarchical structure.

7. The computer implemented method of claim 1 further comprising:
   for each enumerative element of the set of enumerative elements:
      determining state options of the enumerative element.

8. The computer implemented method of claim 7, wherein the state options of the enumerative element comprise any one of a single state option, a set of binary state options, and a set of tertiary options.

9. The computer implemented method of claim 7, wherein generating the checklist item corresponding to the enumerative element further comprises generating the checklist item to include a user actionable control that can be manipulated by the computer user to indicate one of a plurality of states for the checklist item.

10. The computer implemented method of claim 1, wherein the content identified by the checklist request comprises third-party content to the computer user.

11. The computer implemented method of claim 10, wherein content identified by the checklist request comprises a reference to the content at a network location remote to the computer user.

12. The computer implemented method of claim 1, wherein generating the checklist in response to the checklist request from the computer user is conducted on the computer user's computing device.

13. The computer implemented method of claim 1, wherein generating the checklist in response to the checklist request from the computer user is conducted on a network computing device remote to the computer user's computing device.

14. A computer readable medium bearing computer executable instructions which, when executed on a computing system comprising at least a processor, carry out a method for generating a checklist from content in response to a checklist request from a computer user, the method comprising:
   determining a content type of the content identified by the checklist request;
   determining basis content of the content identified by the checklist request via a user interface of a checklist service, wherein the basis content is determined according to bounds established by a computer user and included in the checklist request;
   analyzing the content according to the determined content type to identify a set of enumerative elements in the basis content and to further identify a hierarchical structure of the enumerative elements, the set of enumerative elements comprising at least two enumerative elements;
   for each enumerative element of the set of enumerative elements:
      determining a hierarchical level of the enumerative element within the hierarchical structure;
      generating a checklist item corresponding to the enumerative element according to the determined hierarchical level of the enumerative element, the generated checklist item further including at least a portion of subject matter of the basis content corresponding to the enumerative element; and
      adding the generated checklist item as an item of the generated checklist; and returning the generated checklist in response to the checklist request.

15. The computer readable medium of claim 14, the method further comprising:
   for each enumerative element of the set of enumerative elements:
      determining state options of the enumerative element.

16. The computer readable medium of claim 15, wherein the state options of the enumerative element comprise any one of a single state option, a set of binary state options, and a set of tertiary options.

17. The computer readable medium of claim 15, wherein generating the checklist item corresponding to the enumerative element further comprises generating the checklist item to include a user actionable control that can be manipulated by the computer user to indicate one of a plurality of states options for the checklist item.

18. A computer system for generating a checklist from content in response to a checklist request from a computer user, the system comprising a processor and a memory, wherein the processor executes instructions stored in the memory as part of or in conjunction with additional components to respond to the checklist request, the additional components comprising at least:
   a checklist generator component that generates a checklist for the computer user from the content in response to the checklist request from the computer user, wherein the checklist generator component comprises:
      a document identification module that determines a document type of content identified in the checklist request by the computer user;
      a plurality of document parser components, wherein each document parser component determines document structure and parse elements from content of one of a plurality of document types;
      a document analysis component that carries out a document analysis of identified content of a checklist request, in conjunction with a document parser selected according to the document type of the content, to identify a set of enumerative elements in the content and to further identify a hierarchical structure of the enumerative elements in the content, the set of enumerative elements comprising at least two enumerative elements identified via a user interface of a checklist service; and
      a checklist builder component that iterates through the enumerative elements identified by the document analysis component and, for each enumerative element:
         generate a checklist item corresponding to the enumerative element according to the determined hierarchical level of the enumerative element, the generated checklist item further including at least a portion of subject matter of a basis content corresponding to the enumerative element, wherein the basis content is determined according to bounds established by a computer user and included in the checklist request;
         add the generated checklist item as an item of the generated checklist; and
         return the generated checklist in response to the checklist request.

19. The computer system of claim 18, wherein the checklist builder component determines state options of each enumerative element;
   wherein the state options of the enumerative element comprise any one of a single state option, a set of binary state options, and a set of tertiary options; and
   wherein the checklist builder further generates the checklist item to include a user actionable control that can be manipulated by the computer user to indicate one of a plurality of states options for the checklist item.

* * * * *